United States Patent [19]

Imaseki

[11] Patent Number: 4,966,249
[45] Date of Patent: Oct. 30, 1990

[54] ACTIVE CONTROL FOR DISTRIBUTING DRIVING FORCE OVER FOUR-WHEELS OF FOUR-WHEEL DRIVE VEHICLE

[75] Inventor: Takashi Imaseki, Zushi, Japan

[73] Assignee: Nissan Motor Co., Ltd., Yokohama, Japan

[21] Appl. No.: 255,939

[22] Filed: Oct. 11, 1988

[30] Foreign Application Priority Data

Oct. 9, 1987 [JP] Japan .................. 62-255746

[51] Int. Cl.⁵ .................. B60K 17/20; B60K 23/04
[52] U.S. Cl. .................. 180/233; 180/197; 180/248; 364/424.1; 475/86; 475/88; 475/231; 475/240
[58] Field of Search .................. 180/197, 247, 248, 249, 180/233; 364/424.1; 475/86, 88, 231, 240

[56] References Cited

U.S. PATENT DOCUMENTS

| | | | |
|---|---|---|---|
| 4,466,502 | 8/1984 | Sakai | 180/247 |
| 4,511,014 | 4/1985 | Makita | 180/233 |
| 4,558,414 | 12/1985 | Sakakiyama | 364/424.1 |
| 4,562,541 | 12/1985 | Sakakiyama | 364/424.1 |
| 4,566,554 | 1/1986 | Suzuki | 180/249 |
| 4,586,583 | 5/1986 | Yamakawa et al. | 180/247 |
| 4,609,064 | 9/1986 | Suzuki et al. | 180/233 |
| 4,679,463 | 7/1987 | Ozaki et al. | 475/86 |
| 4,681,185 | 7/1987 | Hoernig et al. | 180/247 |
| 4,715,466 | 12/1987 | Ishii et al. | 180/233 |
| 4,754,834 | 7/1988 | Ozaki et al. | 180/233 |
| 4,757,870 | 7/1988 | Torii et al. | 180/233 |
| 4,790,404 | 12/1988 | Naito | 180/197 |

FOREIGN PATENT DOCUMENTS

| | | |
|---|---|---|
| 43237 | 1/1982 | European Pat. Off. . |
| 182312 | 5/1986 | European Pat. Off. . |
| 189176 | 7/1986 | European Pat. Off. . |
| 0189176 | 7/1986 | European Pat. Off. . |
| DE37410-09A1 | 6/1988 | Fed. Rep. of Germany . |
| 2577485 | 8/1986 | France . |
| 61-102320 | 5/1985 | Japan . |
| 61-157437 | 7/1986 | Japan . |
| 61-178233 | 8/1986 | Japan . |
| 61-244627 | 10/1986 | Japan . |
| 61-244628 | 10/1986 | Japan . |
| 62-241732 | 10/1987 | Japan . |
| 882786 | 11/1981 | U.S.S.R. . |
| 2102907 | 2/1983 | United Kingdom . |
| 2104178 | 3/1983 | United Kingdom . |
| 2118666 | 11/1983 | United Kingdom . |

Primary Examiner—Mitchell J. Hill
Attorney, Agent, or Firm—Foley & Lardner, Schwartz, Jeffery, Schwaab, Mack, Blumenthal & Evans

[57] ABSTRACT

An active torque distribution controller for the wheels of a motor vehicle detects a longitudinal acceleration and a side acceleration to which the vehicle is subject. Based on these longitudinal and side accelerations, a running mode which the vehicle is involved in is detected, and a torque distribution ratio of a portion of torque delivered to the front wheels to the remaining portion to the rear wheels and a differential limiting force are varied in response to a predetermined control schedule for the running mode detected.

5 Claims, 6 Drawing Sheets

ACTIVE CONTROL FOR DISTRIBUTING DRIVING FORCE OVER FOUR-WHEELS OF FOUR-WHEEL DRIVE VEHICLE

BACKGROUND OF THE INVENTION

The present invention relates to a system for and a method of actively controlling torque distribution unit a pair of primary driving wheels and a pair of secondary driving wheels of a motor vehicle.

JP No. 61-178233 discloses a system for controlling torque distribution of a motor vehicle of the four-wheel drive type. This known system includes a limited slip differential between a pair of primary driving wheels and a transfer unit which is capable of changeover between a four-wheel drive and a two-wheel drive. When the two-drive is selected, a differential limiting force is not applied to the differential, allowing a slip between the main driving wheels, whereas when the four-wheel drive is selected, the differential limiting force is applied to the differential, limiting the slip between the driving wheels.

According to this known system, since there is no differential limiting force when the two-wheel drive is selected, the inner wheels tend to spin when the vehicle is subject to a high side acceleration (more than 0.8 G, for example) and a high longitudinal acceleration (more than 0.2 G, for example) during the vehicle making a turn with the two-wheel drive. This results in loss of driving force. When the vehicle make a turn with the four-wheel drive state and is subject to a mudium degree of side acceleration (more than 0.5 to 0.7 G, for example) and a medium degree of longitudinal acceleration (0.2 G, for example), the vehicle is subject to understeer owing to the application of the differential limiting force to the diffrential mechanism between the primary driving wheels. Thus, the readiness of the vehicle to change its heading (yawing moment) drops.

An object of the present invention is to provide a system for and a method of actively controlling torque distribution over primary and secondary driving wheels of a motor vehicle such that the torque distribution over all of the primary and secondary driving wheels is appropriately varied according to varying running modes of the vehicle.

SUMMARY OF THE INVENTION

According to the present invention, the torque distribution ratio of the portion of torque delivered to the secondary driving wheels to the remaining portion of torque delivered to the primary driving wheels, and a differential limiting force applied to a differential mechanism between the primary driving wheels are controlled with appropriate coordination in response to longitudinal and side accelerations to which the vehicle is subject.

According to one aspect of the present invention, there is provided a system for controlling torque distribution over a pair of primary driving wheels and a pair of secondary driving wheels of a motor vehicle when the motor vehicle is making a turn, the vehicle having a torque split and transfer means for varying the torque distribution ratio of the portion of torque toward the pair of secondary driving wheels to the remaining portion of torque toward the pair of primary driving wheels in response to a torque distribution ratio indicative signal, and a limited slip differential means disposed between the pair of primary driving wheels for varying a differential limiting force between the pair of primary driving rear wheels in response to a differential limiting force indicative signal, the system comprising:

means for detecting longitudinal acceleration to which the vehicle is subject and generating a longitudinal acceleration indicative signal;

means for detecting a side acceleration to which the vehicle is subject and generating a side acceleration indicative signal; and controller means for controlling the torque distribution indicative signal and the differential limiting force indicative signal in response to said longitudinal acceleration indicative signal and said side acceleration indicative signal.

According to another aspect of the present invention, there is provided a method of controlling torque distribution over a pair of primary driving wheels and a pair of secondary driving wheels of a motor vehicle when the motor vehicle is making a turn, the vehicle having a torque split and transfer means for varying the torque distribution ratio of a portion of the torque toward the pair of secondary driving wheels to the remaining portion of the torque toward the pair of primary driving wheels in response to a torque distribution ratio indicative signal, and a limited slip differential means disposed between the pair of primary driving wheels for varying a differential limiting force between the pair of primary driving rear wheels in response to a differential limiting force indicative signal, the method comprising the steps of:

detecting a longitudinal acceleration to which the vehicle is subject and generating a longitudinal acceleration indicative signal;

detecting a side acceleration to which the vehicle is subject to and generating a side acceleration indicative signal; and controlling the torque distribution indicative signal and the differential limiting force indicative signal in response to said longitudinal acceleration indicative signal and said side acceleration indicative signal.

DETAILED DESCRIPTION OF THE INVENTION

Figure 1:
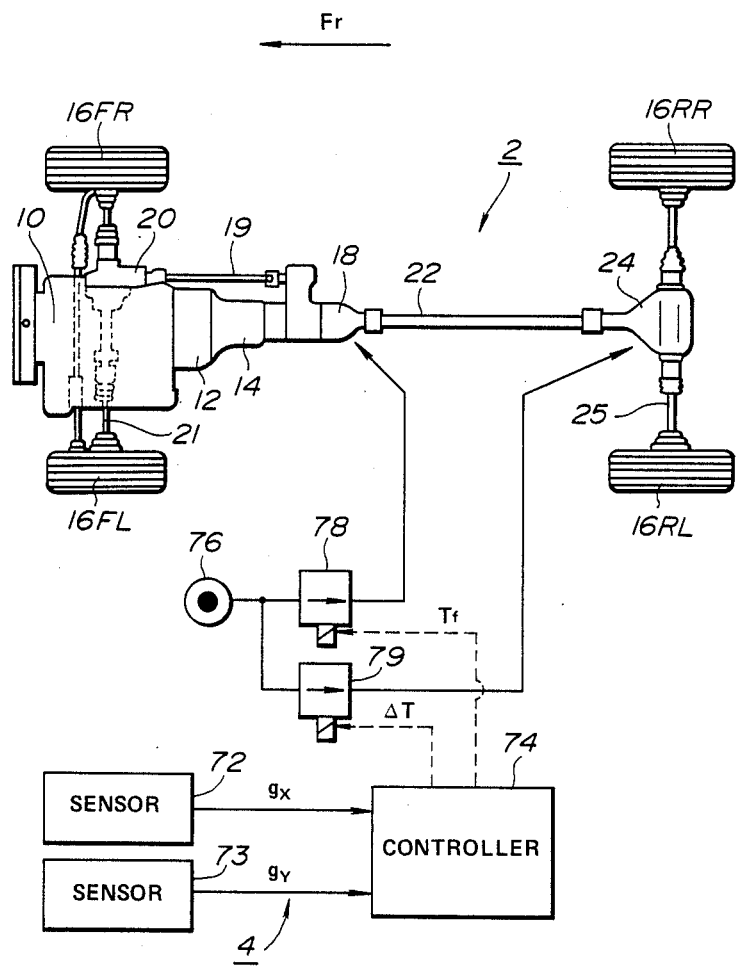
FIG. 1 is a block diagram of an embodiment according to the present invention.

Referring to the accompanying drawings and particularly to FIG. 1, the reference numeral 2 generally indicates a power train system for a motor vehicle of the four-wheel drive and front engine rear drive type, while the reference numeral 4 generally indicate a system for controlling torque distribution over the four wheels of the motor vehicle. As shown in FIG. 1, the motor vehicle includes an engine 10 followed by a clutch 12 and a transmission 14. The output of the transmission 12 is supplied to a torque split and transfer unit 18 where the output torque is split into a portion to be delivered to secondary driving front wheels 16FL and 16FR and a remaining portion of the output torque is delivered to primary driving rear wheels 16RL and 16RR. The first portion of the torque is delivered to the front wheels 16FL and 16FR via a shaft 19, a front differential 20, and a front drive axle assembly 21. The remaining portion of the torque is delivered to the rear wheels 16RL and 16RR via a drive shaft 22, a limited slip differential (LSD) 24, and a rear drive axle assembly 25.

Figure 2:
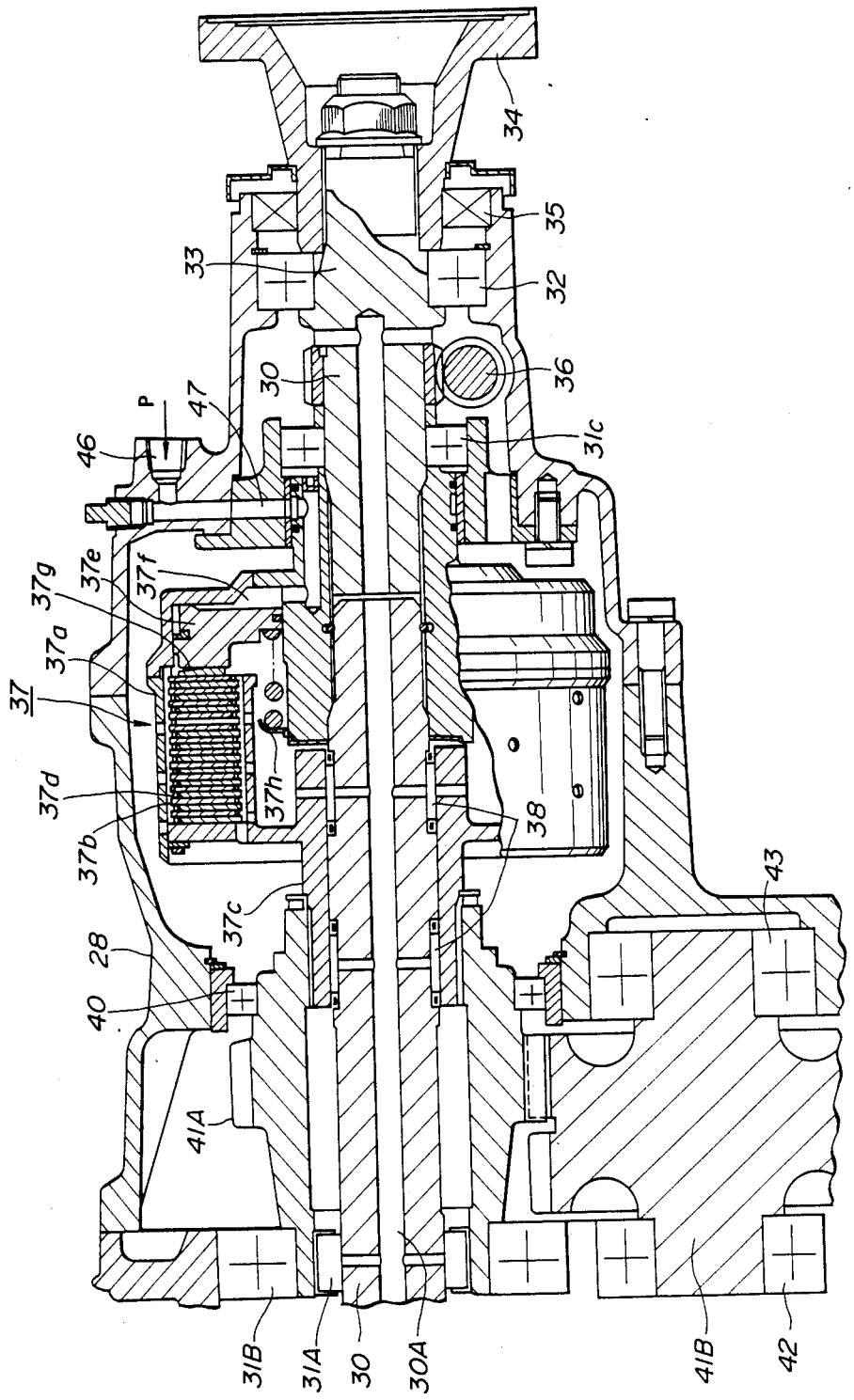
FIG. 2 is a longitudinal fragmentary section of a torque split and transfer unit used in the embodiment.

Referring to FIG. 2, the transfer unit 18 is illustrated. This transfer unit is substantially the same as a transfer unit illustrated in FIG. 2 and described in U.S. Pat. No. 4,757,870 issued on Jul. 19, 1988 to Torii et al. which has been incorporated herein by reference in its entirety.

Briefly, the transfer 18 unit includes a transfer case 28. Extending into this transfer case 28 is an input shaft 30 fixedly coupled with the output shaft of the transmission 14. This input shaft 30 is rotatably supported by means of bearings 31A, 31B and 31C. As viewed in FIG. 2, the input shaft 30 has a righthand end fixedly rotatable with an output shaft 33 that is rotatably supported by means of bearing 32. The output shaft 33 has fixedly connected thereto, by a spline connection, an attachment flange 34 which is fixedly connected to the drive shaft 22 (see FIG. 1). There are also illustrated an oil seal 35 and a pinion 36 for a speedometer.

The reference numeral 37 generally indicates a multiple-plate hydraulic clutch 37. This hydraulic clutch 37 is engaged with an engagement force proportional to a torque distribution ratio indicative hydraulic pressure and varies the torque distribution ratio of the portion of torque delivered toward the front wheels 16FL and 16RL to the remaining portion of torque delivered toward the rear wheels 16RL and 16RR. This clutch 37 includes a clutch drum 37a splined to the input shaft 30. A plurality of driving clutch plates 38b are splined to the clutch drum and interleaved with a plurality of driven clutch plates 37d which are splined to a clutch hub 37c. The clutch hub 37c is rotatably supported by the input shaft 30 by means of needle bearing 38. The clutch 37 also includes a clutch piston 37e and a cylindrical servo chamber 37f defined between the clutch piston 37e and the radial closed end wall of the clutch drum 37a. There are also illustrated a dish plate 37g and a clutch return spring 37f.

The clutch hub 37c is splined to a first gear 41A which is rotatably supported by the transfer case 28 by means of bearings 31B and 40. This first gear 41A is in mesh with a second gear 41B which is rotatably supported in the transfer case 28 by means of bearings 42 and 43. The second gear 41B is fixedly coupled with the shaft 19 leading toward the front wheels 16FL and 16FR.

The before-mentioned hydraulic fluid pressure indicative of desired torque distribution is supplied to an inlet port 46. The inlet port 46 communicates with a fluid passage 47 formed through the transfer unit. This fluid passage 47 communicates with the cylinder chamber 37F.

When there is no supply of hydraulic fluid pressure to the inlet port 46, there is no hydraulic fluid pressure build-up on the cylinder chamber 37f. Since no pressure acts on the clutch piston 37e, the interleaved clutch plates 37b and 37d are disengaged owing to the action of the return spring 37h. In this state, all of the input torque applied to the input shaft 30 is delivered toward the rear wheels 16RL and 16RR, and thus the torque distribution ratio is 0:100. When there is a supply of hydraulic fluid pressure to the inlet port 46, the clutch piston 37e urges the interleaved clutch plates 37d and 37b into engagement with each other against the action of the return spring 37h, allowing a portion of the input torque to be delivered through the frictional engagement between the interleaved clutch plates 37b and 37d toward the front wheels 16FL and 16FR. This portion of the input torque varies in proportion to a clutch engagement force between the interleaved clutch plates 37b and 37d. The clutch engagement force in turn is variable in proportion to the magnitude of the hydraulic fluid pressure supplied to the inlet port 46. This, the torque distribution ratio between the front and rear wheels is variable in response to the hydraulic fluid pressure supplied to the inlet port 46 from 0:100 to 50:50.

Figure 3:
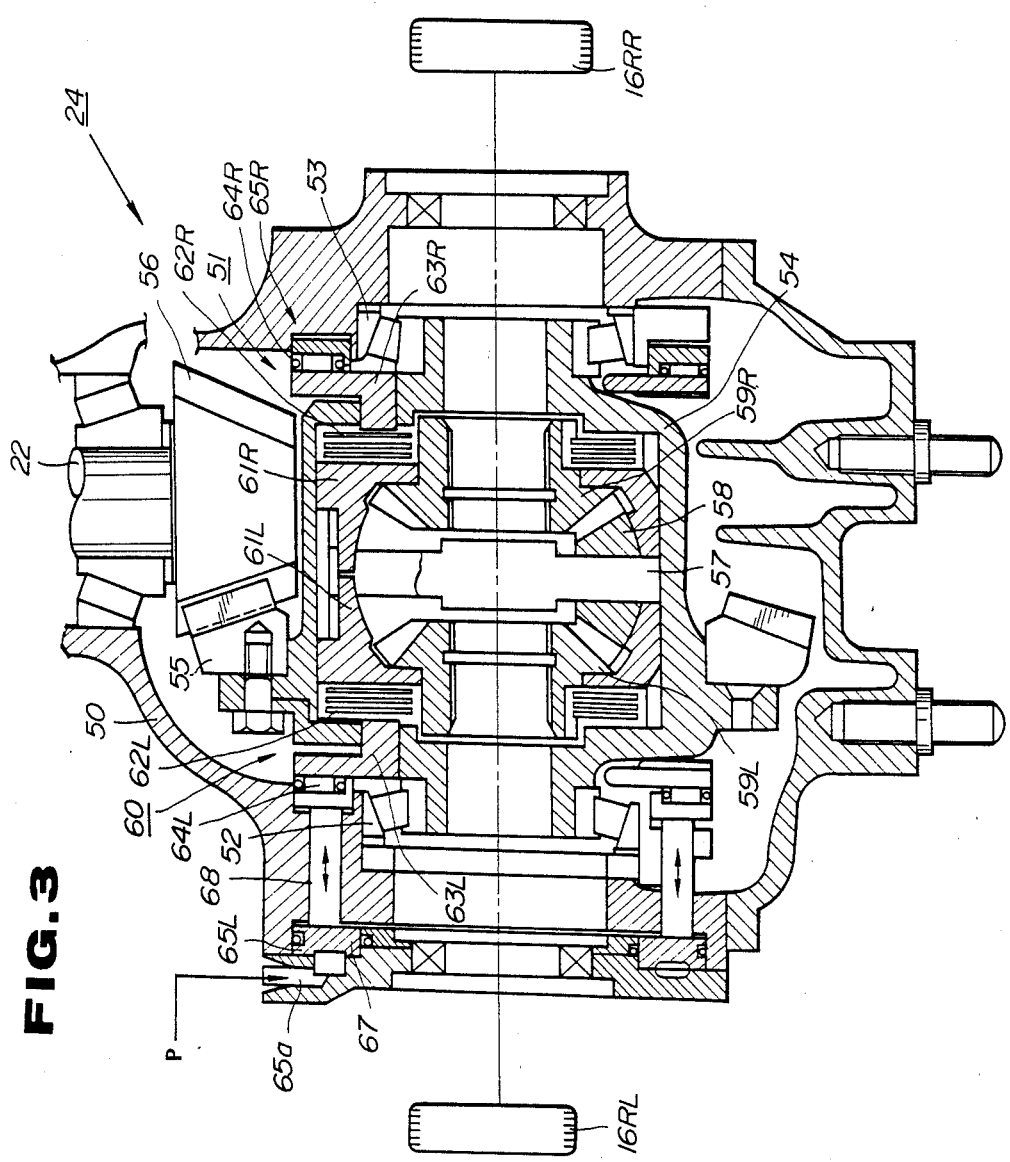
FIG. 3 is a section of a limited slip differential used in the embodiment.

Referring to FIG. 3, there is illustrated the limited slip differential 24. This limited slip differential 24 is substantially the same as limited slip differential illustrated in FIG. 1 and described in U.S. Pat. No. 4,679,463 issued on Jul. 14, 1987 to Ozaki et al., which is incorporated herein by reference in its entirety.

Briefly, the limited slip differential 24 includes within a housing 50 a differential mechanism 51. The differential mechanism 51 includes a differential gear case 54 rotatably supported within the housing 50 by means of bearings 52 and 53. The differential gear case 54 has fixed thereto a final ring gear 55 which is in mesh with a drive pinion gear 56 of the drive shaft 22.

Within the differential gear case 54, there are pinion gears 58 rotatably mounted on a pinion mate shaft 57, and a pair of side gears 59L and 59R meshing with the pinion gears 58. Splined to the side gears 59L and 59R are inner end portions of rear drive axles 25 of the rear left and right wheels 16RL and 16RR, respectively.

There is provided in the differential gear case 54 a differential action limiting mechanism 60. This differential limiting mechanism 60 includes a pair of pressure rings 61L and 61R rotatably mounted on side gears 59L and 59R, respectively. Although not shown, the pressure rings 61L and 61R are formed with wedge-shaped notches. The differential limiting mechanism 60 also includes hydraulic friction clutches 62L and 62R which are engaged by the associated preload applying levers 63L and 63R, and cylinder portions 65L and 65R which bias the associated preload applying levers 63L and 63R via bearings 64L and 64R, respectively. The left cylinder portion 65L is formed in a lefthand end, viewed in FIG. 3, of the housing 50, and it has a piston 67 which has a piston rod 68 extending through the housing 50 to the preload applying lever 63L.

When, the vehicle is travelling straight forward with the steering wheel held in its neutral center position, there occurs no rotation speed differential between the left and right rear wheels 16RL and 16RR. Thus, input to the differential mechanism 51 from the drive shaft 22 is transmitted via the drive pinion gear 56 and the final gear 55 to the differential case 54, and then to the pinion mate shaft 57, and to the side gear 59L and 59R via the pinion gears 58, and to the rear wheels 16RL and 16RR via the rear drive axles 25. In this running state of the vehicle, therefore, the differential gear case 54 and side gears 59L and 59R rotate at the same speed, so that the pressure rings 61L and 61R are not thrown radially outward. Thus, the differential limiting mechanism 60 remains deactivated.

When the vehicle is making a right turn, for example, there is the supply of hydraulic fluid pressure to an inlet port 65a (see FIG. 3), inducing a differential action limiting force. In this state, the pressure rings 61L and 61R are thrown radially outward owing to the edge action, causing the friction clutches 62L and 62R to produce differential limiting force. As a result, the torque of the side gear 59L connected to the outer one 16RL of the rear wheels decreases, whereas a torque of the side gear 59R connected to the inner one 16RR of the rear wheels increases. The differential limiting force is variable with clutch engagement forces at the friction clutches 62L and 62R which are variable in proportion to the hydraulic fluid pressure supplied to the inlet port 65a.

Referring back to FIG. 1, the torque distribution control system 4 includes a longitudinal acceleration sensor 72 and a side acceleration sensor 73. The outputs $g_X$ and $g_Y$ of these sensors 72 and 73 are supplied to a controller 74 which generates outputs indicative of instruction values $T_f$ and $\Delta T$ (delta T). The control system 4 includes a hydraulic fluid pressure source 76 and two pressure regulator valves 78 and 79. These pressure regulator valves 78 and 79 regulate the hydraulic fluid pressure supplied thereto by the source 76 in response to the instruction values $T_f$ and $\Delta T$ (delta T) and deliver output hydraulic pressures toward the transfer unit 18 and the limited slip differential 24.

The longitudinal acceleration sensor 72 and side acceleration sensor 73 are mounted at appropriate locations on the vehicle body and generate analog voltage signals $g_X$ and $g_Y$ indicative of the longitudinal and side accelerations to which the vehicle is subject.

Figure 4:
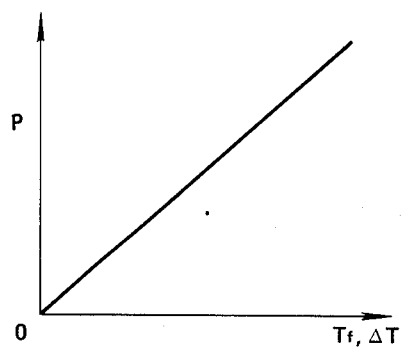
FIG. 4 is a graph showing variation of output the pressure of each of pressure regulator valves with variation of an input instruction value.

The hydraulic fluid pressure source 76 includes a pump driven by the engine 10, a relief valve, and a reverse flow check valve. The output hydraulic fluid pressure of the source 76 is supplied to the pressure regulator valves 78 and 79. Each of the pressure regulator valves 78 and 79 includes a proportional type solenoid having an excitation coil which receives an electric current variable in response to the instruction values $T_f$ and $\Delta T$ (delta T). The output pressures P of the pressure regulator valves 78 and 79 vary in proportion to the associated instruction values $T_f$ and $\Delta T$ (delta T) as shown by the graph in FIG. 4.

Figure 5:
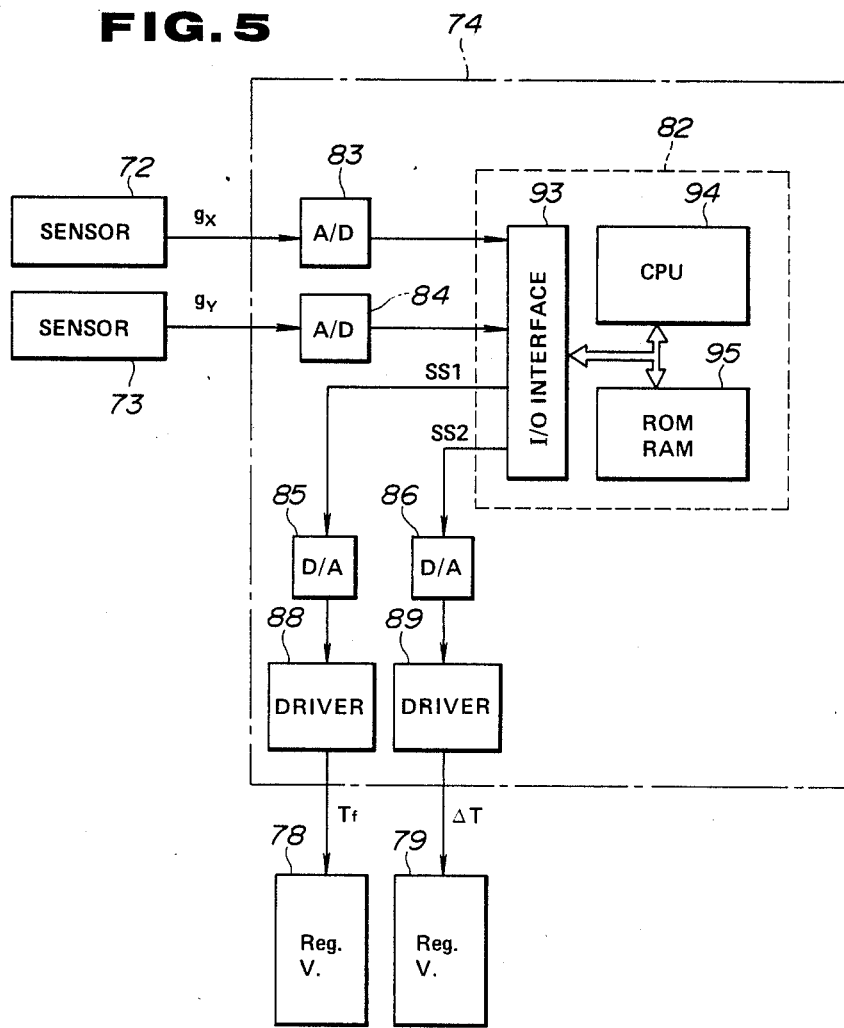
FIG. 5 is a block diagram of a controller with acceleration sensors and pressure regulator valves.

Referring to FIG. 5, the controller 74 includes a microcomputer 82, two analog to digital converters 83 and 84, digital to analog converters 85 and 86, and drivers 88 and 89.

The microcomputer 82 includes at least an input/output interface 93, a central processor unit (CPU) 82, and a memory 95 having a ROM and a RAM. The CPU 82 reads in acceleration indicative signals $g_X$ and $g_Y$ via the interface circuit 93, and performs various arithmetic operations and other operations along with predetermined programs.

The RAM of the memory 95 stores the results of arithmetic operations performed by the CPU 94, and various programs necessary for executing such jobs performed by the CPU 94, and the ROM of the memory 95 stores various permanent data. What are stored as the permanent data, in this embodiment, are data tables concerned with characteristic functions illustrated in FIG. 6. Each of the characteristic functions shows variations with respect to time of an instruction value $\Delta T$ (delta T) indicative of a desired amount of differential action limiting force and another instruction value $T_f$ indicative of a desired value of torque distribution ratio. The torque distribution ratio is a ratio of a portion the torque delivered to the front wheel to the remaining portion of the torque delivered to the rear wheels. The characteristic functions are divided into five different instruction patterns [I] to [V] against seven different running modes (as indicated by characters (A) to (G) in FIG. 6) resulting from various combinations of a high degree (above 0.3 G) of, a medium degree (0.1 G to 0.3 G) of, and a low degree (below 0.1 G) of longitudinal acceleration $G_X$ with a high degree (0.7 G) of, a medium degree (0.3 G to 0.7 G) of, and a low degree (below 0.3 G) of side acceleration $G_Y$.

Figure 6:
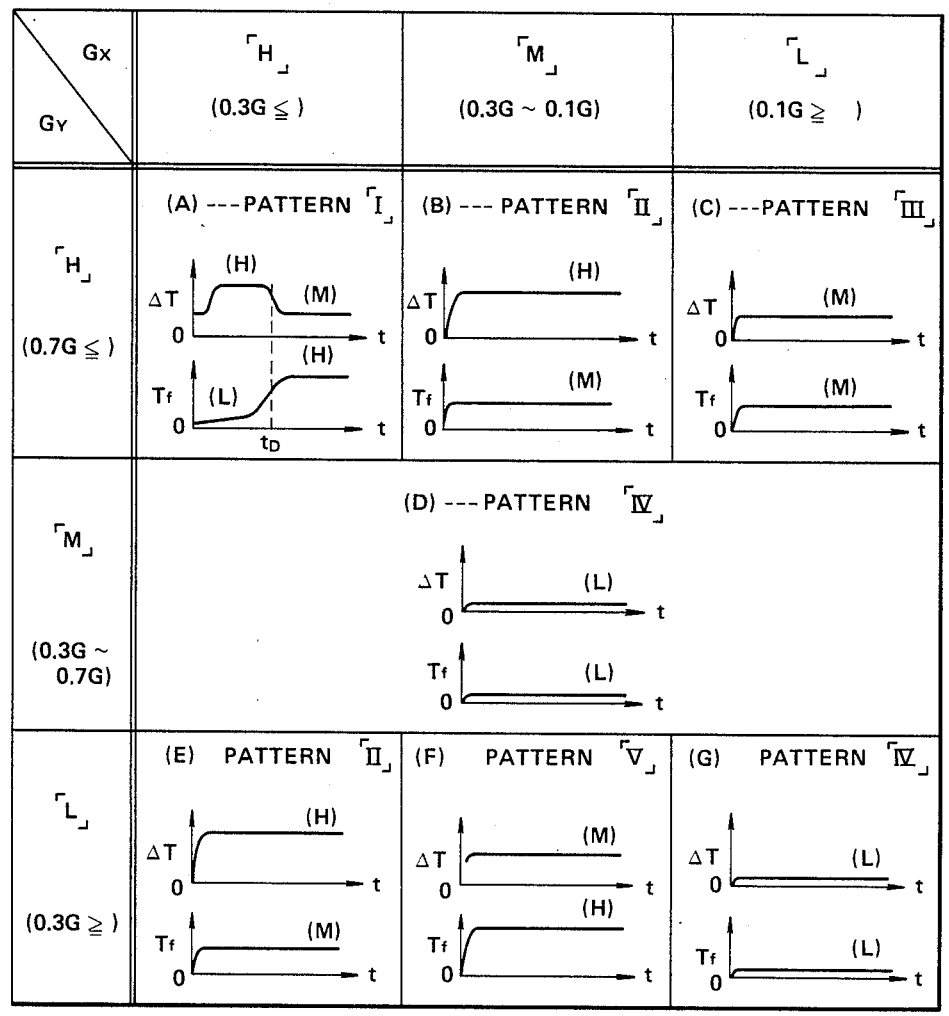
FIG. 6 is a table illustrating various instruction patterns.

Describing in detail, the reference character A shown in FIG. 6 indicates a running mode where the vehicle is subject to a rapid or step-like acceleration when turning on a road with a high friction coefficient and thus the longitudinal acceleration $G_X$ is high and the side acceleration $G_Y$ is high. When this running mode is detected, an appropriate power distribution is made to deal with this running mode. Specifically, as illustrated in the chart, the differential limiting force instruction value $\Delta T$ (delta T) is high and the torque distribution ratio instruction value $T_f$ is low till elapse of a predetermined time $t_D$ (for example, 1.5 seconds), but upon and after elapse of the predetermined time, $\Delta T$ (delta T) drops to a medium level, but $T_f$ increases to a high level (a first instruction pattern [I]).

The reference character B in FIG. 6 indicates a second running mode where the vehicle is driven with an accelerator pedal being depressed and released alternately when turning along a circular path having a large radius at a critical roll angle state, and thus the longitudinal acceleration $G_X$ is medium and the side acceleration $G_Y$ is high. When this running mode is detected, the differential function restraining instruction value $\Delta T$ (delta T) is set at a high level and the front torque distribution instruction value $T_f$ is set at a medium level (instruction pattern [II]).

The reference character C in FIG. 6 indicates a third running mode where the vehicle is driven at a constant vehicle speed when turning along a circular path having a radius at a critical roll angle state, and thus the longitudinal acceleration $G_X$ is low and the side acceleration $G_Y$ is high. When this running mode is detected, the differential function restraining instruction value $\Delta T$ (delta T) and the front torque distribution instruction value $T_f$ are both set at medium levels (instruction pattern [III]).

The reference character D in FIG. 6 indicates a running mode where the vehicle is cornering with the medium degree of side acceleration $G_Y$. In this running mode, a driver always is concerned with an understeer taking place at initial stage of turning. Thus, when this running mode is detected, the differential function restrain instruction value $\Delta T$ (delta T) and the front torque distribution instruction value $T_f$ are set at low degrees (instruction pattern [IV]).

The reference character E shown in FIG. 6 indicates a mode where the vehicle is subject to a quick start-up on a road having a high friction coefficient and thus the longitudinal acceleration $G_X$ is high and the side acceleration $G_Y$ is low. When this mode is detected, the before mentioned instruction pattern [II] is set.

The reference character F shown in FIG. 6 indicates a mode where the vehicle is subject to a start-up on a road with a low friction coefficient. When this mode is detected, the differential function restraint instruction value ΔT (delta T) is medium and the front torque distribution instruction value $T_f$ is high (instruction pattern [V]).

The reference character G shown in FIG. 6 indicates a mode where the vehicle is subject to a tight corner brake and thus both of the longitudinal and side accelerations $G_X$ and $G_Y$ are low. When this mode is detected, the before mentioned instruction pattern [IV] is set.

The setting is made such that when the differential limiting force instruction value ΔT (delta T) is high, the differential limiting force is strong enough to accomplish no rotational speed difference nor slip between right and left wheels, when it is low, the differential limiting force is weak enough to allow a rotational speed difference or slip which is initially set by the differential mechanism, and when it is medium, the differential limiting force is medium to provide a medium degree of slip between the above-mentioned two states. The setting of the torque distribution ratio instruction value $T_f$ is such that when it is high, the torque distribution ratio is 50:50, when it is medium, the ratio is 30:70, and when it is low, the ratio 5:95.

The operation of the preceding embodiment is described in connection with FIG. 7.

When the engine 10 starts, a working hydraulic fluid under constant pressure is supplied by the hydraulic fluid source 76 to the pressure regulator valves 78 and 79. Concurrently with the start-up of the engine 10, the controller 74 is activated to repeat the execution of a job routine illustrated in FIG. 7 over a predetermined time interval (for example, 3 seconds).

Figure 7:
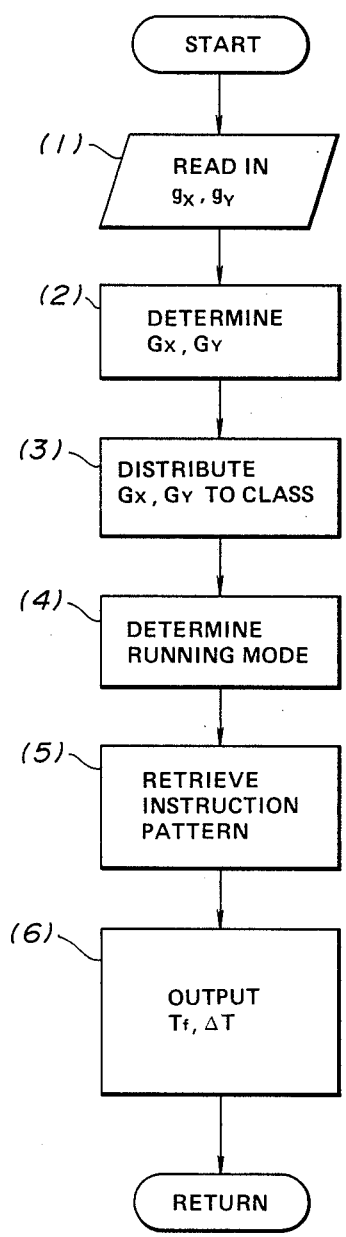
FIG. 7 is a flow chart.

In FIG. 7, firstly, at a step (1), the CPU 94 reads in a longitudinal acceleration signal $g_X$ from the sensor 72 and a side acceleration signal $g_Y$ from the sensor 73 via the A/D converters 83 and 84 and the interface circuit 93 and has them stored in the RAM of the memory 96. Then, at a step (2), the stored longitudinal acceleration signal $g_X$ and side acceleration signal $g_Y$ are used to perform arithmetic operations to give a longitudinal acceleration $G_X$ and a side acceleration $G_Y$ and the results are stored in the RAM.

Sebsuquently, at a step (3), the central processor unit 94 distributes the longitudinal acceleration $G_X$ and side acceleration $G_Y$ stored at the step (2) to one of three classes, that is, high, medium, and low, which each of the data should belong to. Then, at step (4), the CPU 94 obtains a running mode allocated to a combination of the classes to which the stored longitudinal and side accelerations have been distributed.

Thereafter, at a step (5), the CPU 94 selects among all of the available instruction patterns [I] to [V] (see FIG. 7) one allocated to the running mode obtained at the step (5). Then, at a step (6), the central processor unit 94 sets appropriate differential limiting force and torque distribution ratio instruction values ΔT (delta T) and $T_f$ after retrieving the data table, stored in the ROM of the memory 95. Then, the CPU 94 determines control signals SS1 and SS2 corresponding to the instruction values set in the preceding step, and delivers them via the interface 93 to the D/A converters 85 and 86. Then, the control returns to the main program. The execution of this flow chart illustrated in FIG. 7 is repeated at a predetermined time interval.

The digital control signals SS1 and SS2 delivered from the microcomputer 82 are converted at the D/A converters 85 and 86 to analog signals. These analog signals are fed to the drivers 88 and 89 to cause them to supply the excitation coils of the proportional type solenoids of the pressure regulator valves 78 and 79 with electric currents corresponding to the controls signals SS1 and SS2. As a result, the pressure regulator valve 78 supplies a hydraulic pressure P proportional to the torque distribution ratio instruction value $T_f$ to the inlet port 46 of the transfer unit 18 (see FIG. 2), causing the clutch 37 to produce a clutch engagement force proportional to the hydraulic pressure P. This causes the torque distribution ratio to be adjusted to the instruction value $T_f$. On the other hand, the other pressure regulator valve 79 supplier the inlet port 65a of the limited slip differential 24 (see FIG. 3) with a hydraulic fluid pressure P proportional to the differential limiting force instruction value ΔT. This causes the clutches 62L and 62R to produce clutch engagement force corresponding to the hydraulic fluid pressure P. As a result, the differential limiting force is adjusted to the instruction value ΔT (delta T).

Describing the operation referring to the running modes one after another, when the vehicle is subject to a quick acceleration while turning on a road with a high friction coefficient, the longitudinal acceleration and side acceleration both become high, so that the control based on the before-mentioned instruction pattern [I] is executed. That is, the differential limiting force instruction value ΔT (delta T) becomes high enough to increase the differential limiting force and the torque distribution ratio instruction value $T_f$ becomes low to decrease the torque distribution ratio until the elapse of the predetermined time $t_D$. Since the differential limiting force becomes strong, the driving torque on the outer driving wheel becomes larger than the driving torque on the inner driving wheel, inducing a yawing moment on the vehicle body, while, since the torque distribution ratio drops, the turning radius becomes small. This combination considerably increases the readiness of the vehicle to change its heading. After elapse of the predetermined time $t_D$, the differential limiting force is weakened to a medium level and the torque distribution ratio is increased, preventing occurrence of rear wheels 16RL and 16RR skidding which might otherwise be expected, suppressing yawing motion of the vehicle to a level under control. Thus, a drop in controllability of the vehicle, which otherwise might be prospected after the initial stage, has been definitely compensated for.

Next, when the vehicle is driven with the accelerator pedal being depressed and released alternately while turning along a circular path having a large radius at a critical roll angle state, the side acceleration is high and the longitudinal acceleration is medium, so that the control based on the before mentioned instruction pattern [II] is executed. In this state, the differential limiting force is increased to cause the outer driving wheel to have a driving torque larger than a driving torque on the inner driving wheel, inducing an undermoment which suppresses yawing moment of the vehicle. At the same time, the torque distribution ratio is set at the medium level, decreasing the portion of torque borne by the rear wheels, resulting in increased stability of the vehicle.

When the vehicle is driven at a constant vehicle speed when turning along a circular path having a radius at a critical roll angle state, the side acceleration is high and the longitudinal acceleration is low, so that the torque distribution control based on the instruction pattern [III] is executed. In this state, the differential restraint force and the front torque distribution are both set at the medium levels, so that the running stability of the vehicle is enhanced. As a result, the vehicle will not undergo yawing even if it receives external disturbance during running.

When the vehicle is cornering with the medium degree of side acceleration, the driving torque distribution control based on the instruction pattern [IV] is executed regardless of the magnitude of longitudinal acceleration. In this case, the differential limiting force and the torque distribution ratio are both set at low levels, eliminating an undermoment, thus increasing the readiness of the vehicle to change its heading. Thus, the understeer at the initial stage of cornering becomes negligible.

When the vehicle is subject to a quick start-up on a road having a high friction coefficient, the side acceleration is low and the longitudinal acceleration is high, so that the control based on the instruction pattern [II] is executed. That is, the differential limiting force is increased, the torque distribution ratio is set at the medium level, and the slip ratio S between the rear wheels 16RL and 16RR is slightly increased to a value, for example of being approximately 0.1. With this setting, the engine revolution increases so that the vehicle start-up using the maximum value of the engine torque becomes possible.

When the vehicle is subject to a start-up on a road with a low friction coefficient, the side acceleration is low and the longitudinal acceleration is medium, so that the control based on the instruction pattern [V] is executed where the differential limiting force is set to the medium level and the torque distribution ratio is set at the high level. In this case, the engine torque is overwhelming in view of the road friction coefficient, causing a rapid increase in tire slip ratio. To compensate for this undesirable state expected, the torque distribution ratio is set at the high level, maintaining good ground pressure of the rear tires, thus eliminating a an expected drop in driving force needed for start-up of the vehicle. Additionally, since the differential limiting force is set at the medium level, there has been eliminated the occurrence of vehicle steer which would be expected if the differential limiting force were increased while running on the road with a low friction coefficient. As a result, the straight forward running performance of the vehicle is increased.

When the vehicle is subject to a tight corner brake and thus both of the side and longitudinal accelerations are low, the torque distribution control based on the instruction pattern [IV] is executed. As a result, the readiness of the vehicle to change its heading is increased.

Although, in the preceding embodiment, the longitudinal and side accelerations detected or determined have been correlated with to one of three predetermined classes, the present invention is not limited to this classification. The present invention include providing more than three classes and more five instructions patterns corresponding to increased number of combination of the classes.

What is claimed is:

1. A system for controlling torque distribution to a pair of primary driving wheels and a pair of secondary driving wheels of a motor vehicle when said motor vehicle is making a turn said vehicle having torque split and transfer means for varying a torque distribution ratio which is the ratio of a portion of torque distributed to said pair of secondary driving wheels to the remaining portion of torque distributed to said pair of primary driving wheels in response to a torque distribution ratio indicative signal, and limited slip differential means disposed between said pair of primary driving wheels for varying differential limiting force between said pair of primary driving wheels in response to a differential limiting force indicative signal, said system comprising:
   means for detecting longitudinal acceleration to which said vehicle is subject and generating a longitudinal acceleration indicative signal;
   means for detecting side acceleration to which said vehicle is subject and generating a side acceleration indicative signal; and
   controller means for providing said torque distribution ratio indicative signal and said differential limiting force indicative signal in response to said longitudinal acceleration indicative signal and said side acceleration indicative signal.

2. A system as claimed in claim 1, wherein said controller means comprises means for storing data tables concerning vehicle characteristic functions according to a plurality of classes, means for correlating said longitudinal acceleration indicative signal with one of said plurality of classes and said side acceleration indicative signal with one of said plurality of classes, and means for retrieving from said means for storing running mode data allocated to a combination of said classes with which said longitudinal and side acceleration indicative signals have been correlated.

3. A system as claimed in claim 1, wherein said controller means maintains said torque distribution ratio indicative signal at a decreased value and said differential limiting force indicative signal at an increased value until elapse of a predetermined time after said longitudinal acceleration indicative signal and said side acceleration indicative signal both have exceeded predetermined values, respectively, and subsequently increases said torque distribution ratio indicative signal and decreases said differential limiting force indicative signal after elapse of said predetermined time.

4. A method of controlling torque distribution to a pair of primary driving wheels and a pair of secondary driving wheels of a motor vehicle when said motor vehicle is making a turn, said vehicle having torque split and transfer means for varying a torque distribution ratio which is the ratio of a portion of torque distributed to said pair of secondary driving wheels to the remaining portion of torque distributed to said pair of primary driving wheels in response to a torque distribution ratio indicative signal, and limited slip differential means disposed between said pair of primary driving wheels for varying differential limiting force between said pair of primary driving wheels in response to a differential limiting force indicative signal, said method comprising the steps of:
   detecting longitudinal acceleration to which said vehicle is subject and generating a longitudinal acceleration indicative signal;
   detecting side acceleration to which said vehicle is subject and generating a side acceleration indicative signal; and
   providing said torque distribution ratio indicative signal and said differential limiting force indicative signal in response to said longitudinal acceleration indicative signal and said side acceleration indicative signal.

5. A method as claimed in claim 4, wherein said providing step includes a step of maintaining said torque distribution ratio indicative signal at a decreased value and said differential limiting force indicative signal at an increased value until elapse of a predetermined time after said longitudinal acceleration indicative signal and said side acceleration indicative signal both have exceeded predetermined values, respectively, and a subsequent step of increasing said torque distribution ratio indicative signal and decreasing said differential limiting force indicative signal after elapse of said predetermined time.

* * * * *